Figure 1:
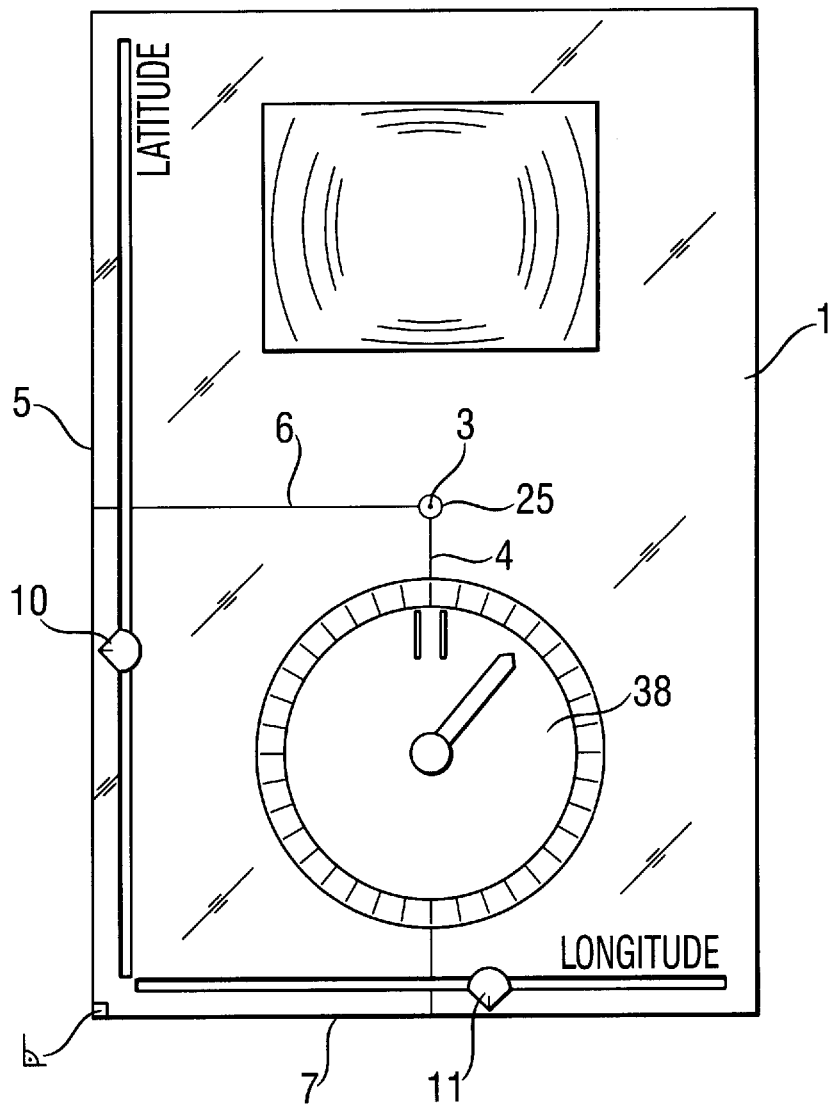

United States Patent
Virtanen

[11] Patent Number: 5,819,426
[45] Date of Patent: Oct. 13, 1998

[54] AID FOR NAVIGATION, POSITIONING AND/OR ORIENTATION

[76] Inventor: Timo Virtanen, Hämenntie 107, Helsinki, Finland, 00550

[21] Appl. No.: 704,566
[22] PCT Filed: Mar. 13, 1995
[86] PCT No.: PCT/FI95/00135
§ 371 Date: Sep. 10, 1996
§ 102(e) Date: Sep. 10, 1996
[87] PCT Pub. No.: WO95/25259
PCT Pub. Date: Sep. 21, 1995

[30] Foreign Application Priority Data

Mar. 15, 1994 [FI] Finland ................................ 940164 U
Oct. 4, 1994 [FI] Finland .................................. 944634

[51] Int. Cl.$^6$ .................................................... B43L 13/00
[52] U.S. Cl. ................................................. 33/431; 33/1 G
[58] Field of Search ........................... 33/1 B, 1 G, 1 K, 33/1 C, 15 B, 431, 457, 465; 434/153

[56] References Cited

U.S. PATENT DOCUMENTS

| | | | |
|---|---|---|---|
| 375,590 | 12/1887 | Wilson | 33/431 |
| 1,808,359 | 6/1931 | Lewis | 33/431 |
| 2,105,103 | 1/1938 | Sinitzin-White | 33/431 |
| 2,891,314 | 6/1959 | Haschek | 434/153 |
| 3,271,866 | 9/1966 | Gruber et al. | 33/431 |
| 3,673,690 | 7/1972 | De Barros | 33/431 |
| 3,824,693 | 7/1974 | Cherry | 33/431 |
| 4,426,789 | 1/1984 | Goodrich | 33/1 C |

FOREIGN PATENT DOCUMENTS

| | | | |
|---|---|---|---|
| 2094961 | 2/1972 | France. | |
| 44 00 448 | 7/1994 | Germany | 434/153 |
| 38656 | 12/1912 | Sweden | 33/431 |
| 9420943 | 9/1994 | WIPO. | |

*Primary Examiner*—G. Bradley Bennett
*Attorney, Agent, or Firm*—Merchant, Gould, Smith, Edell, Welter & Schmidt

[57] ABSTRACT

An aid for navigation, positioning and/or orientation, said aid comprising a transparent plate (1) comprising a straight first edge (5); a straight second edge (7) which is at right angles against the first edge, a longitude line (4) which has been drawn on the plate (1) to parallel the first edge (5), a latitude line (6) which has been drawn on the plate (1) to parallel the second edge (7), and a position index point (3) which is located at the intersection of the longitude line and the latitude line, a latitude pointer (10) which is connected in the vicinity of the first edge (5) to be movable in direction paralleling the first edge, and longitude pointer (11) which is connected in the vicinity of the second edge (7) to be movable in direction paralleling the second edge.

15 Claims, 6 Drawing Sheets

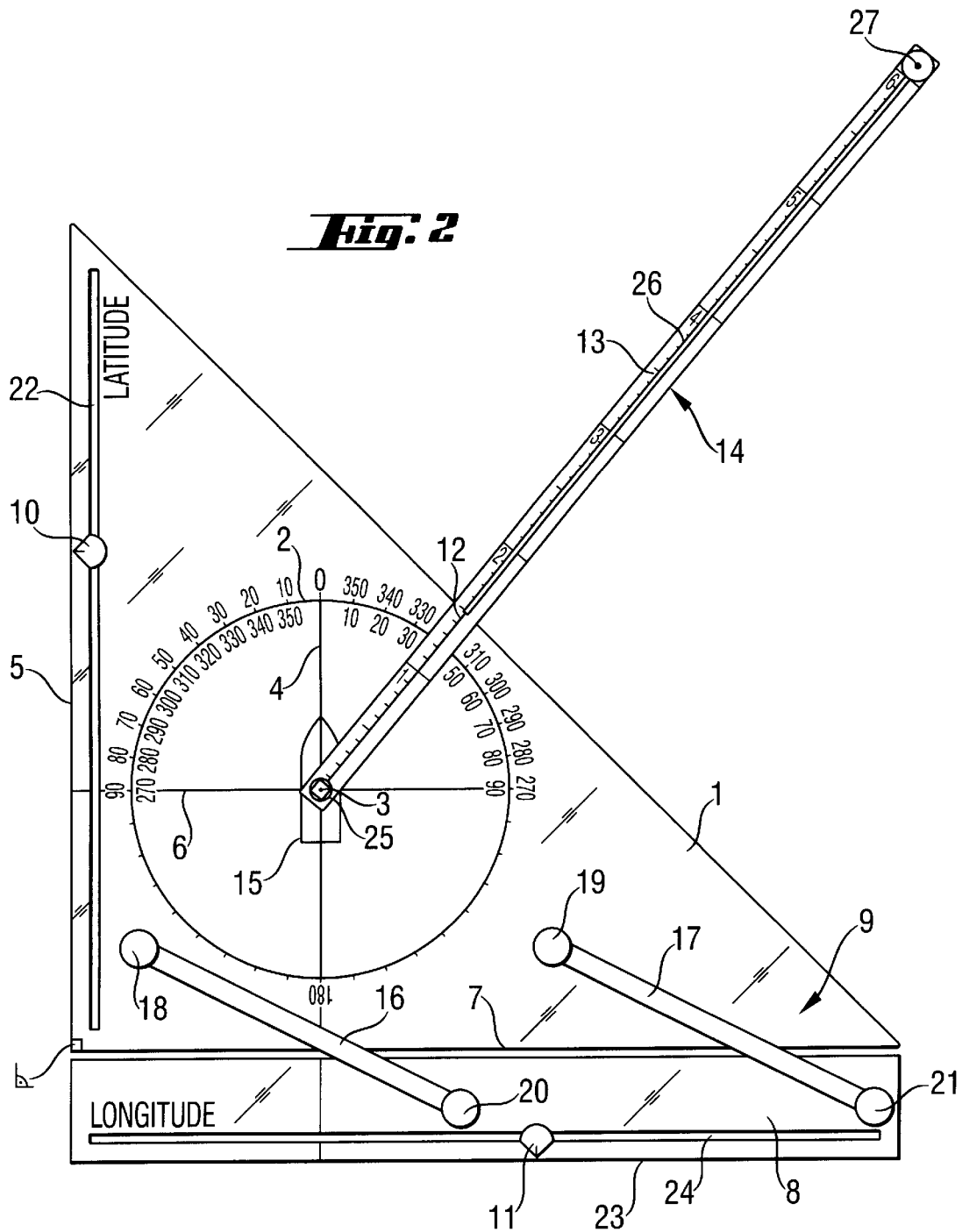

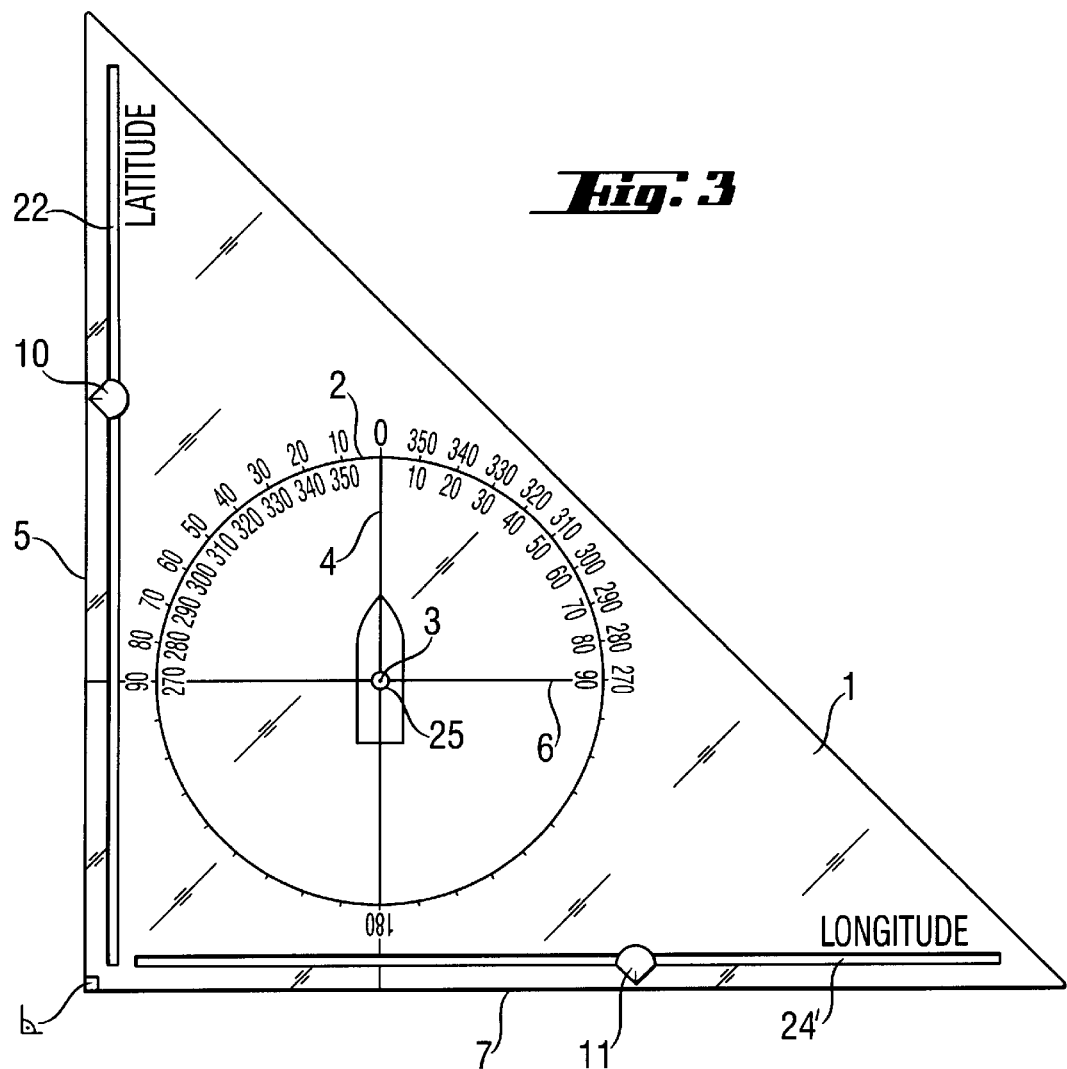

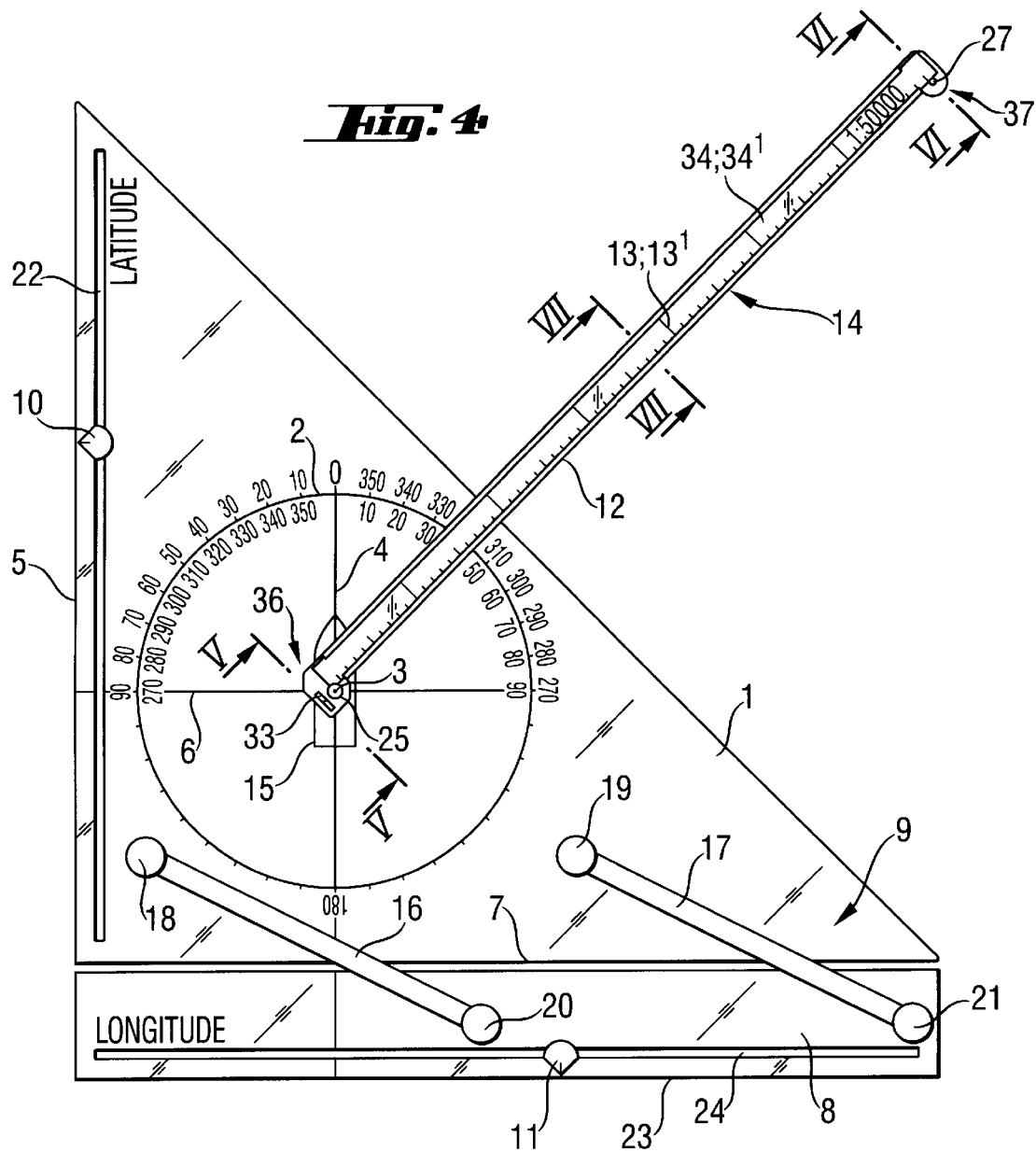
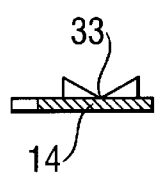
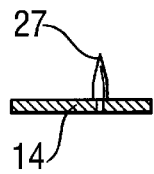
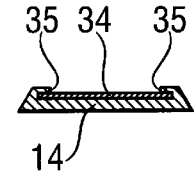

AID FOR NAVIGATION, POSITIONING AND/OR ORIENTATION

Navigation is determining the position of a ship or boat and selecting course. The fundamental instrument of navigation is the nautical chart, on which in addition to coastlines and islands have been marked e.g. reefs, depths and buoys. Directions are determined by means of a compass. Coastal navigation is intermediate between archipelagic navigation and deep sea navigation. It requires positioning by means of direction finding in addition to observation of buoys.

In positioning so-called placers are used, at least two such being required. The placers may be two numeric position readings, two directions, one direction and one sounding, a direction and a distance, or other data defining the position of the vessel. Deep sea navigation is usually radio navigation or astronomical navigation. Radio beacons are used in aid of radio navigation. In astronomical navigation the elevation of a celestial body over the horizon and its azimuth, or compass bearing, are found, in addition to which the precise time must be known. The position of the vessel can be calculated from these data with the aid of tables.

In terrain orientation, map and compass serve as aids to find the bearing of any desired terrestrial target.

In navigation, and nowadays also in orientation on land and in road traffic, determination of position on the basis of the numeric position reading furnished e.g. by radio beacons or by a satellite navigator device (e.g. GPS=Global Positioning System) is becoming increasingly common. The problem in orientation on land has been that heretofore no suitable, easy-to-use aid has been available by which determining of location on the map is easily accomplished when the numeric position readings are known.

As aid in navigation compasses, triangular protractors, direction rulers, transport rulers, and other graduated rulers have been used. All these are presently employed as separate components in various tasks of navigation, such as determining position on the nautical chart, defining true bearing, defining bows bearing, defining distances, and parallel transposition of the protractor on the nautical chart. The problem with navigation aid of prior art is that, being separate components, they are awkward to keep at hand, and to use, in addition to which their purchase price is high.

The object of the invention is to eliminate the drawbacks mentioned.

The specific object of the invention is to disclose an easy-to-use aid for navigation, positioning and/or orientation on land and on sea, which enables determination of position on the map on the basis of numeric position readings without any compasses or the like being needed to this purpose.

It is furthermore an object of the invention to disclose an aid for navigation to which can be connected a desired number of ancillary parts to constitute an entity which can be handled and kept in storage as an integral whole, and which integral entity can be used to perform those navigation tasks which are essential in seafaring.

As taught by the invention, the aid comprises a transparent plate comprising a straight first edge; a straight second edge which is at right angles to the first edge, a longitude line which has been drawn on the plate parallel to the first edge, a latitude line which has been drawn on the plate parallel to the second edge, and a position index point which is located at the intersection of the longitude line and the latitude line, a latitude pointer which is connected in the vicinity of the first edge to be movable in the direction parallel to the first edge, and a longitude pointer which is connected in the vicinity of the second edge to be movable in the direction parallel to the second edge.

The advantage of the invention is that with the movable latitude and longitude pointers the position of the vessel can be determined on the terrain map or nautical chart on the basis of the numeric position reading derived e.g. from radio beacons or from a satellite navigation device (e.g. GPS= Global Positioning System) without any use of special compasses to this purpose.

In an embodiment of the aid a 360° graduation circle has been provided on the plate, its center coinciding with the position index point, the longitude line being parallel with the line drawn from this center to the zero point of the graduation and with the first edge of the plate.

In an embodiment of the aid the longitude pointer is connected to the plate to be movable in the direction paralleling the second edge.

In an embodiment of the aid the aid comprises a compass, which is connected to the plate.

In an embodiment of the aid the aid comprises a transport ruler connected with a parallelogram mechanism beside the second edge of the plate, paralleling the second edge; and a longitude pointer which is connected to the transport ruler.

In an embodiment of the aid the plate is substantially rectangular in shape.

In an embodiment of the aid the plate is substantially shaped like a right-angled triangle.

In an embodiment of the aid the aid comprises a bearing ruler which is pivoted to the center to be rotatable in a plane parallelling the plane of the plate.

In an embodiment of the aid the bearing ruler is provided with a distance graduation, its zero point coinciding with the center.

In an embodiment of the aid the aid comprises a set of graduated strips provided with distance graduations in different scales and which can be detachably mounted on the bearing ruler. The set of graduated strips may comprise graduated strips for all those nautical chart scales which are in use.

In an embodiment of the aid the bearing ruler and/or the graduated strip comprises fixing means for affixing the graduated strip to the bearing ruler.

In an embodiment of the aid there is on the bearing ruler, at the first end adjacent to the center, a sight notch and at the free, other end, a sight bead.

In an embodiment of the aid the plate comprises a guide in the vicinity of the first edge of the protractor and parallelling the edge, in guidance of which the latitude pointer can be moved, and the latitude line extends from the position index point up to the first edge.

In an embodiment of the aid the plate comprises a guide in the vicinity of its second edge parallelling the edge, in guidance of which the longitude pointer can be moved, and the longitude line extends from the position index point up to the second edge.

In an embodiment of the aid the transport ruler comprises a second guide provided in the vicinity of its free edge and parallelling the edge, in guidance of which the longitude pointer can be moved in a direction parallelling the second edge of the plate, i.e., in the direction of the edge of the transport ruler, and when the transport ruler is positioned against the second edge of the plate, the longitude line extends from the position index point across the transport ruler up to its edge.

In an embodiment of the aid there is an a piercing hole at the position index point. The hole enables markings to be made on the map and the aid to be mounted on a gunwale bearing stand.

The device being provided with one or several ancillaries, such as transport ruler and bearing ruler, the aid is easy to handle and to keep in storage as an integral entity, and the essential tasks of navigation can be accomplished therewith, such as determination of location, various determinations of direction, and taking of bearings. The most important needs of normal map work have been taken into account in the aid; therefore the use of this aid is fast and clear-cut.

Figure 8:
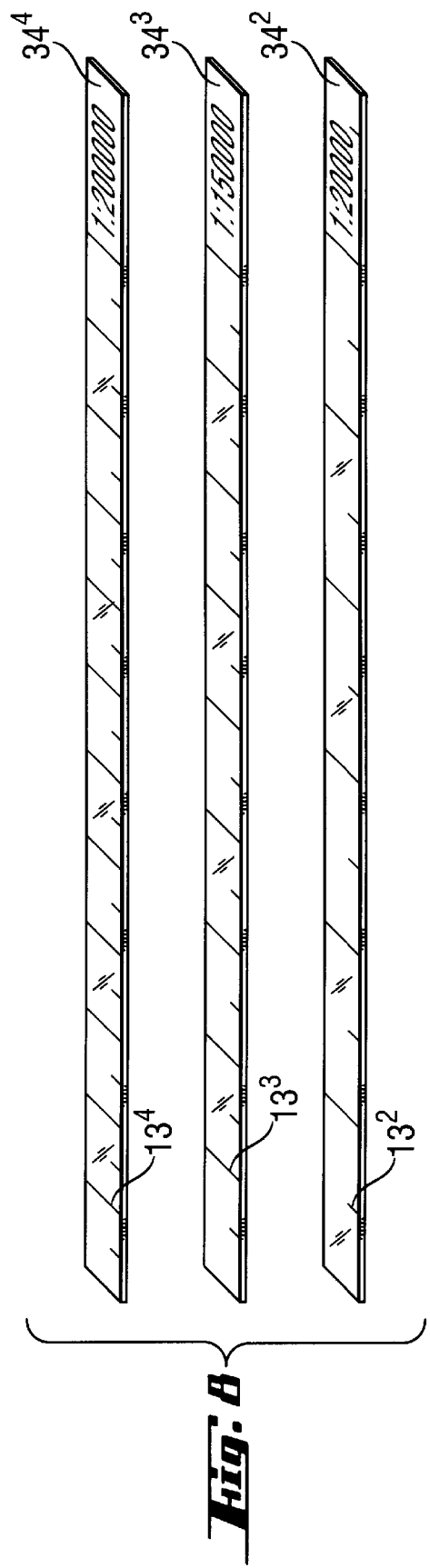
Figure 9:
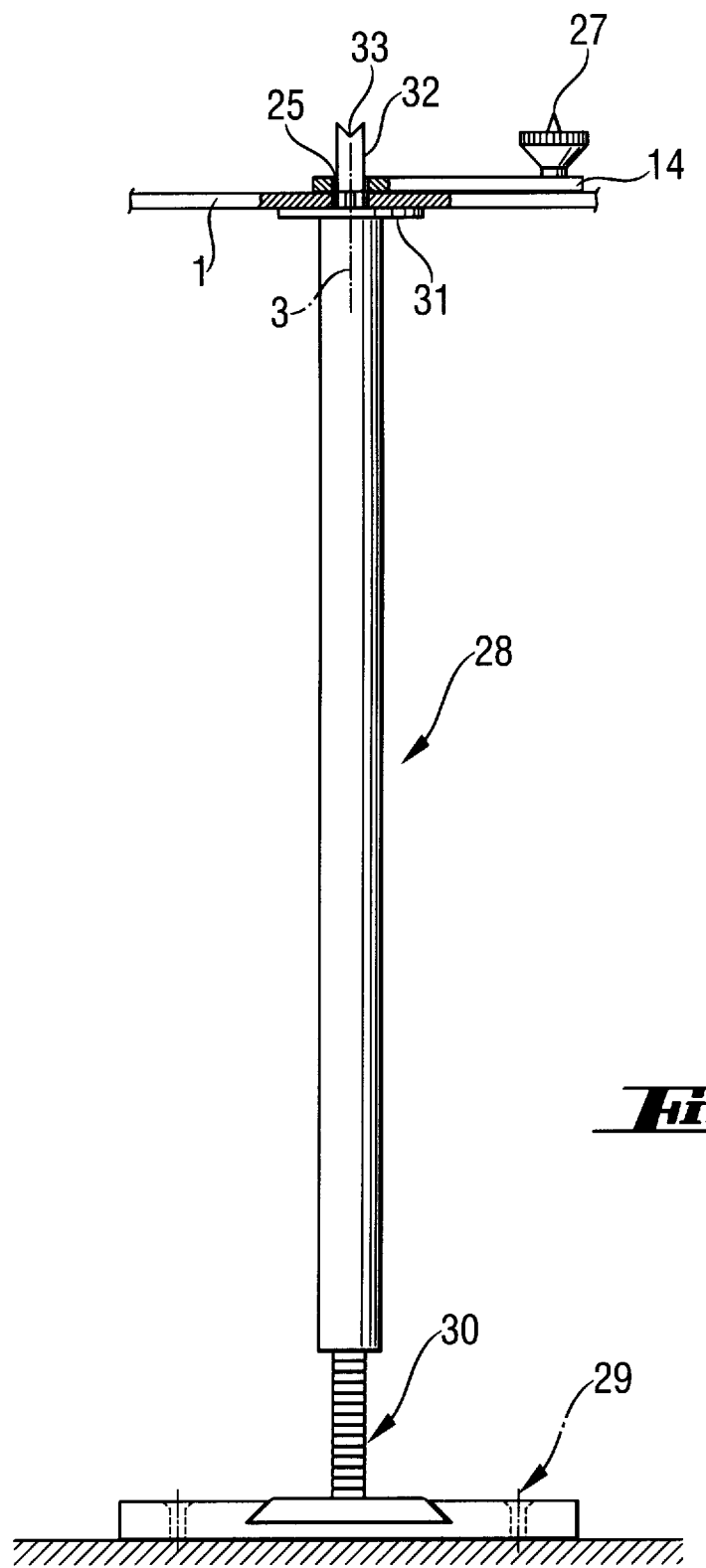

In the following the invention is described in detail, referring to the attached drawing, wherein FIG. 1 presents schematically a first embodiment of the aid of the invention;

FIG. 2 presents schematically a second embodiment of the aid of the invention;

FIG. 3 presents schematically a third embodiment of the aid of the invention;

FIG. 4 presents schematically a fourth embodiment of the aid, of the invention;

FIG. 5 resents the section III—III of FIG. 4;

FIG. 6 presents the section IV—IV of FIG. 4;

FIG. 7 presents the section V—V of FIG. 4;

FIG. 8 resents a set of graduated strips provided with distance graduations in various scales, for mounting on the bearing ruler, belonging to the embodiment of FIG. 4; and FIG. 9 presents a stand to which the navigation aid of FIG. 2 or 4 can be connected in order to use it as a so-called gunwale bearing device.

FIG. 1 depicts an aid which is intended to be used in orientation and positioning on land. The aid comprises a transparent plate 1 of rectangular form, comprising a straight first edge 5 and a straight second edge 7, this latter edge being at right angles against the first edge. A longitude line 4 has been drawn on the plate 1 parallel to the first edge 5, and a latitude line 6 has been drawn on the plate 1 parallel to the second edge 7. At the intersection of the longitude line 4 and the latitude line 7 is the position index point 3, where a hole 25 piercing the plate has been provided. The aid further comprises a latitude pointer 10, which is connected in the vicinity of the first edge 5 to be movable in the direction parallel to the first edge 5, and a longitude pointer 11, which is connected in the vicinity of the second edge 7 to be movable in the direction parallel to the second edge 7. The aid may furthermore comprise a compass 38, though this is not indispensable in itself. Operation of the device takes place as described in the foregoing in the context of the example relating to marine navigation.

FIG. 2 depicts a navigation aid for use in marine navigation. The aid comprises a protractor 1 with the shape of a right-angled triangle, which is regarded as base, or body, to which all the other parts of the aid are connected. The triangular protractor plate 1 consists of transparent material, such as a plate of transparent plastic which has the shape of an isosceles right-angled triangle. In the center of the protractor plate 1 has been drawn a circular 360° graduation 2, the angular degrees being marked both inside and outside the peripheral circle so that in the outer circle the number of degrees increases counter-clockwise from the zero point and on the inner circle, in opposite direction, that is clockwise. In the following, the edge adjacent to the right angle of the protractor 1 (the cathete of the right-angled triangle) is termed the first edge 5. Correspondingly, the other edge adjacent to the right angle of the protractor 1 (the other cathete of the right-angled triangle) is termed the second edge 7.

The longitude line 4 is the line drawn from the center, 3 of the graduation circle to the zero point, vertical in FIG. 1. The longitude line 4 is parallel to the above-mentioned first edge 5. In the direction perpendicular against the longitude line 4 from the center 3 has in FIG. 1 been drawn the horizontal so-called latitude line 6, which is parallel to the above-mentioned second edge 7. At the center 3 has been depicted a schematic representation of the vessel, 15, its bows pointing toward the zero point of the circular graduation 2.

Furthermore, the navigation aid of FIG. 2 comprises a transport ruler 8 connected to the protractor plate 1. The transport ruler 8 is connected by means of a parallellogram mechanism 9 beside the second edge 7 of the protractor plate 1, parallelling this edge. The parrallellogram mechanism 9 comprises two linkage arms 16 and 17 of equal length, so-called parallel axes, the distance between their pivot points 18 and 19 on the protractor plate 1 equalling that of the pivot points 20 and 21 on the transport ruler 8, whereby the pivot points 18,19,20,21 define a parallellogram. By action of this parallellogram mechanism 9, the transport ruler 8 maintains at all times its parallellity with the second edge 7 of the protractor plate 1. By the aid of the transport ruler 8, the protractor plate 1 can be moved to any point on the nautical chart, retaining its specified attitude. The use of the transport ruler 8 in connection with navigation is not described any further in this context because it belongs to the know-how of a person skilled in the art.

The latitude pointer 10 is connected in the vicinity of the first edge 5 of the protractor plate 1 so that it can be reciprocatingly moved in the direction parallel to the edge 5 and that, having been moved to a given point, it stays where it has been set until it is moved once again. As can be seen in FIG. 1, close to the edge 5 of the protractor plate 1 has been provided a guide 22 parallelling the edge 5, e.g. a slot, in guidance of which the latitude pointer 10 can be moved. The latitude line 6 extends up to the first edge 5.

The longitude pointer 11 is connected, in the example of FIG. 2, to the transport ruler 8 in the vicinity of its free lower edge 23 so that the pointer 11 can be moved in the direction parallel to the second edge 7 of the protractor plate 1, i.e., in the direction of the lower edge 23 of the transport ruler 8, and when it has been moved to a given position it will remain where it has been set until it is moved once more. As can be seen in FIG. 2, in the vicinity of the lower edge 23 of the transport ruler 8, or the edge 23, has been provided a guide 24 parallelling the edge, e.g. a slot, in guidance of which the longitude pointer 11 can be moved. When the transport ruler 8 is positioned against the second edge 7 of the protractor plate, the longitude line 4 extends across the transport ruler up to the edge 23.

In the simple embodiment of the aid depicted in FIG. 3 the aid comprises no transport ruler and no bearing ruler. The longitude pointer 11 is connected to the plate 1 to be movable in the direction parallelling the second edge 7. To this purpose, on the plate 1 has been provided a guide 24', e.g. a slot, in the vicinity of its second edge 7 and parallelling the edge 7, in guidance of which the longitude pointer can be moved. The longitude line 4 extends from the center 3 to the second edge 7. The pointer 11 can be moved in the direction parallelling the second edge 7, and after it has been moved to a given point, it remains at the place where it has been set until it is moved once more. In other respects the navigation aid of FIG. 3 corresponds to the embodiment of FIG. 2.

It is further seen from FIG. 2 that at the position index point 3, that is at the center 3 of the circular graduation has been provided a piercing hole 25 at the virtual intersection of the latitude and longitude lines, through which markings can be made on the map with a pencil. The navigation aid of FIG. 2 furthermore comprises a bearing ruler 14 connected to the center 3 of the protractor plate 1 and provided with center line 12 and distance graduation 13. The bearing ruler 14 is pivoted at the center 3 to be rotatable in a plane parallelling the plane of the protractor plate 1. The zero point of the distance graduation 13 coincides with the center 3. The bearing ruler 14 has in the middle a longitudinal slot 26.

FIG. 4 depicts an embodiment of the navigation aid regarding which reference is made to the description of the embodiment of FIG. 2 in all other respects except regarding the bearing ruler 14, which differs from that in the embodiment of FIG. 1.

In FIG. 4 the navigation aid comprises a bearing ruler 14 which is pivoted to the center 3 to be rotatable in a plane parallelling the plane of the protractor plate 1. The bearing ruler 14 is provided with a distance graduation 13 having its zero point at the center 3. The distance graduation 13 has here been provided on a graduation strip 34, which is detachably mountable on the bearing ruler 14.

In FIGS. 4 and 8 is depicted a set, belonging to the navigation aid, of graduation strips 34; $34^1, 34^2, 34^3, 34^4$ provided with distance graduations 13; $13^1, 13^2, 13^3, 13^4$ in different scales, which are detachably mountable on the bearing ruler 14. The requisite number of graduation strips 13 has been provided, in the present example four different graduation strips for scales 1:20000, 1:50000, 1:150000 and 1:200000. The distance graduation on the graduated strip 13 matches the scale of the nautical chart in each instance. The bearing ruler 14 comprises fixing means 35 for attaching the graduated strip to the bearing ruler. FIG. 7 depicts, as section V—V of FIG. 4, a fixing means consisting of flanges 35 pointed towards each other and under which the graduated strip 13 is pushed in the direction longitudinal to the bearing ruler in the way of a so-called dovetail joint.

The bearing ruler 14 carries on its first end 36 adjacent to the center 3, a sight notch 33, and on the other, free end 37 a sighting bead 27 is provided (see FIGS. 5 and 6).

In the following are briefly described the possible uses of aid of the kind presented above, in positioning and navigation. Let us assume that from a navigator device, e.g. from GPS, for the position of the vessel is obtained a numeric reading, e.g. latitude N60°7'25" (North 60 degrees, 7 minutes, 25 seconds) and longitude e.g. E25°23'10" (East 23 degrees, 23 minutes, 10 seconds).

The nautical chart is divided into squares by lines running in north-south direction and lines running in west-east direction e.g. at 5' (five minute) spacing. One finds on the graduation on the vertical margin of the nautical chart, the point N60°7'25" and moves the navigation aid to this point on the graduation so that the latitude line 6 becomes positioned at the reading N60°7'25" on said graduation. Next, one moves the latitude point 10 to the point corresponding to the nearest west-east latitude line, the so-called latitude parallel, on the nautical chart, i.e., to N60°5', because the grid of lines is spaced at 5' on the chart.

The same procedure is applied to longitude: on the horizontal graduation of the nautical chart the point of E25°23'10" is found, and the navigation aid is so aligned with said graduation that the longitude line 4 coincides with the reading E25°23'10" on the graduation. The longitude pointer 11 is then moved on the nautical chart to the point corresponding to the nearest north-south longitude line, the so-called longitude parallel (E25°25'). The position has thus been stored in the address memories 10,11 of the navigation aid. The navigation aid is next moved to such a point on the nautical chart where the latitude pointer 10 coincides with the latitude parallel N60°5' while at the same time the longitude pointer 11 is positioned consistent with said longitude parallel E25°25'. The position index 3 now indicates the position of the vessel on the map. One may now mark the location of the vessel on the map through the piercing hole 25 at the position index point, or the center 3. Positioning on land is performed in completely identical manner.

Turning the plate 1 in the predetermined, desired direction so that the first edge 5 and the longitude line 4 point in said direction enables the true direction of the vessel to be determined from the outer division of the graduated circle 2.

The bow bearing can be determined from the inner division of the graduated circle 2, the center-line 12 of the bearing ruler 14 serving as pointer for reading degrees. Distances can be read from the distance graduation 13 of the bearing ruler.

The longitudinal slot 26 in the middle of the bearing ruler 14, depicted in FIG. 2, enables pencil markings to be made on the map. In FIG. 4, on the other hand, one edge of the bearing ruler 14 coincides with the respective center, and map markings can be made by tracing the edge.

FIG. 9 depicts an ancillary device by the aid of which the aid of FIGS. 2 and 4 can be used as a so-called gunwale direction finder. To this purpose, the bearing ruler 14 has on its free end, a sighting bead 27. The ancillary device comprises an arm 28 which can be fixed on a stationary structure of the vessel by means of fixing members 29, in the present embodiment applying a dovetail joint. The arm 28 comprises a flexible part 30, which enables the arm to be inclined relative to the vessel. The arm carries on its upper end, transversally to the longitudinal direction of the arm, a supporting plane 31 and a pin 32 rising therefrom, this pin having on its end a sighting notch 33. The navigation aid can be mounted on the end of the arm 28 by pushing the hole 25 in the center 3 on the pin 32 while the protractor plate 1, surrounding said hole, rests with its underside on the supporting plane 31.

The gunwale position finder is operated as follows. The zero point of the graduated circle 2 is aimed to parallel the longitudinal center-line of the vessel, and the protractor is adjusted to be horizontal, using the flexible portion 30 of the arm if the vessel should not be on level keel but should have a list (like e.g. a sailboat). The bearing liner 14 is then aimed to bear on the desired target, e.g. a lighthouse, so that the sighting notch 33 on the end of the pin 32 and the sighting bead 27 on the end of the bearing ruler 14 are aligned. From the graduated circle 2 can now be read the bearing, in the embodiment of FIG. 2 at the center-line 12 of the bearing ruler 14 and in that of FIG. 4, at the edge of the bearing ruler 14.

The invention is not confined to concern merely the embodiment examples presented in the foregoing: numerous modifications are feasible while staying within the scope of the inventive idea defined by the protective claim.

I claim:

1. An aid for navigation, positioning and orientation, characterized in that the aid comprises:

a transparent plate (1) comprising a straight first edge (5), a straight second edge (7) which is at a right angle () against the first edge, a longitude line (4) which has been drawn on the plate (1) to parallel the first edge (5), a latitude line (6) which has been drawn on the plate (1) to parallel the second edge (7), and a position index point (3) which is located at the intersection of the longitude line and the latitude line, having a hole (25) piercing the plate (1);

a latitude pointer (10) which is connected in the vicinity of the first edge (5) to be movable in direction parallelling the first edge; and a longitude pointer (11) which is connected in the vicinity of the second edge (7) to be movable in direction parallelling the second edge.

2. Navigation aid according to claim 1, characterized in that on the plate has been formed a 360° graduated circle (2) of which the center coincides with the position index point (3), the longitude line (4) being parallel with the line drawn from the center (3) to the zero point of the graduated circle and with the first edge (5) of the plate.

3. Aid according to claim 1, characterized in that the longitude pointer (11) is attached to the plate (1) to be movable in the direction parallelling the second edge (7).

4. Aid according to claim 1, characterized in that the aid comprises a compass (38) which is connected to the plate (1).

5. Aid according to claim 1, characterized in that the aid comprises a transport ruler (8) connected by a parallellogram mechanism (9) beside the second edge (7) of the plate to parallel the second edge, and a longitude pointer (11) connected to the transport ruler (8).

6. Aid according to claim 1, characterized in that the plate (1) has substantially the shape of a rectangle.

7. Aid according to claim 1, characterized in that the plate (1) has substantially the shape of a right-angled triangle.

8. Aid according to claim 2, characterized in that the aid comprises a bearing ruler (14) pivoted to the center (3) to be turnable in a plane parallelling the plane of the protractor (1).

9. Aid according to claim 8, characterized in that the bearing ruler (14) is provided with a distance graduation (13) having its zero point at the center (3).

10. Aid according to claim 8, characterized in that the aid comprises a set of graduated strips (34; $34^1, 34^2, 34^3, 34^4$) with distance graduations (13; $13^1, 13^2, 13^3, 13^4$) in different scales which are detachably attachable to the bearing ruler (14).

11. Aid according to claim 10, characterized in that at least one of the bearing ruler (14) and the division strip (34) comprises fixing means (35) for fixing the division strip to the bearing ruler.

12. Aid according to any one of claim 8, characterized in that on the bearing ruler (14), at the first end (36) adjacent to the center (3) is provided a sighting notch (33) and at the free, second end (37) is provided a sighting bead (27).

13. Aid according to any one of claim 1, characterized in that the plate (1) comprises in the vicinity of the first edge (5) of the plate, a guide (22) parallelling the edge (5), in guidance of which the latitude pointer (10) can be moved, and that the latitude line (6) extends from the position index point (3) up to the first edge (5).

14. Aid according to any one of claim 1, characterized in that the plate (1) comprises in the vicinity of its second edge (7), a guide (24') parallelling the edge (7), in guidance of which the longitude pointer (11) can be moved, and that the longitude line (4) extends from the position index point (3) up to the second edge (7).

15. Aid according to any one of claim 5, characterized in that the transport ruler (8) comprises a second guide (24) arranged in the vicinity of its free edge (23) and parallelling said edge (23), in guidance of which the longitude pointer (11) can be moved in the direction parallelling the second edge (7) of the plate (1), that is, in the direction of the edge (23) of the transport ruler (8), and that when the transport ruler (8) is positioned against the second edge (7) the longitude line (4) extends from the position index point (3) across the transport ruler (8) up to the edge (23).

* * * * *